US010736454B1

(12) United States Patent
Serrano

(10) Patent No.: US 10,736,454 B1
(45) Date of Patent: Aug. 11, 2020

(54) NOPAL-CACTUS THORNS REMOVAL HAND TOOL AND METHOD

(71) Applicant: Diego Serrano, Kalamazoo, MI (US)

(72) Inventor: Diego Serrano, Kalamazoo, MI (US)

( * ) Notice: Subject to any disclaimer, the term of this patent is extended or adjusted under 35 U.S.C. 154(b) by 0 days.

(21) Appl. No.: 16/715,480

(22) Filed: Dec. 16, 2019

(51) Int. Cl.
*A47J 17/02* (2006.01)
*B26B 11/00* (2006.01)
*A47G 21/04* (2006.01)

(52) U.S. Cl.
CPC .............. *A47J 17/02* (2013.01); *A47G 21/04* (2013.01); *B26B 11/00* (2013.01)

(58) Field of Classification Search
CPC .. A47J 17/02; A47J 17/04; A47J 17/08; A47J 9/00; A47J 43/28; A47J 43/281; A47G 21/04; A47G 21/045; A47G 21/08
USPC .... 30/142, 147–150, 324–328, 279.2–279.6, 30/301; D7/688, 689, 692, 653; 7/110–113
See application file for complete search history.

(56) References Cited

U.S. PATENT DOCUMENTS

| | | | | | |
|---|---|---|---|---|---|
| 72,136 | A | * | 12/1867 | Webster | A47J 43/1093 30/325 |
| 644,732 | A | * | 3/1900 | Crandall | A47G 21/02 30/149 |
| 1,044,869 | A | * | 11/1912 | Emmenegger | A47J 43/281 30/325 |
| D45,189 | S | * | 2/1914 | Ford | 30/325 |
| D47,016 | S | * | 2/1915 | Sommer | 30/325 |
| 1,263,780 | A | * | 4/1918 | Lieb | A47G 21/02 30/324 |
| 1,272,506 | A | * | 7/1918 | Olander | F16K 31/05 30/325 |
| 1,350,098 | A | * | 8/1920 | Hessey | A47G 21/023 30/279.6 |
| 1,424,722 | A | * | 8/1922 | Hartleb | A22C 25/025 30/142 |
| 1,452,464 | A | * | 4/1923 | Isaacs | A47G 21/04 30/325 |
| 1,555,502 | A | * | 9/1925 | Knoblauch | A47G 21/04 30/325 |
| 1,644,119 | A | * | 10/1927 | Fowler | A47G 19/28 30/325 |
| 1,771,296 | A | * | 7/1930 | Harley et al. | A47J 17/04 30/279.6 |
| 1,784,575 | A | * | 12/1930 | Carlson | A47J 43/281 30/325 |
| 2,046,334 | A | * | 7/1936 | Loeber | A47L 13/08 D7/693 |

(Continued)

FOREIGN PATENT DOCUMENTS

| | | | | |
|---|---|---|---|---|
| DE | 2705287 A1 | * | 8/1978 | A47J 17/04 |
| JP | 2019076675 A | * | 5/2019 | A47J 43/28 |

*Primary Examiner* — Jason Daniel Prone
(74) *Attorney, Agent, or Firm* — Mariana Vernieri

(57) ABSTRACT

A Hand Tool for Removing Nopal-Cactus Thorns is similar in shape to a spoon. This hand tool has a Hole shaped as a polygonal star in its head with a narrow area surrounding that hole for removing the skin and the superficial Thorns of the Nopal Petal by repeatedly rubbing the utensil against the surface of the Petal in a longitudinal fashion, without need of sharpening the edge of the Hole. A Secondary Hole for removing the hardest Thorns and those in the edges and corners of the Nopal Petals and a Corner Blade for cutting it in small squares or small stripes are also present in the tool.

9 Claims, 3 Drawing Sheets

(56) References Cited

U.S. PATENT DOCUMENTS

| | | | | | |
|---|---|---|---|---|---|
| 2,173,751 | A | * | 9/1939 | Burkhart | A01F 11/06 30/279.6 |
| 2,296,404 | A | * | 9/1942 | Ressegger | A47G 21/06 30/324 |
| D136,343 | S | * | 9/1943 | Gamache | 30/325 |
| 2,505,917 | A | * | 5/1950 | Schumacher | A47J 17/04 30/142 |
| D163,028 | S | * | 4/1951 | Donaldson | 30/324 |
| 2,698,481 | A | * | 1/1955 | Pendergast et al. | A61B 17/54 30/27 |
| 2,773,530 | A | * | 12/1956 | Sullivan | A47G 21/023 30/150 |
| 2,876,487 | A | * | 3/1959 | Pasquale | A22C 29/024 30/279.2 |
| 3,004,341 | A | * | 10/1961 | Carroll et al. | B01F 13/002 30/325 |
| 3,328,877 | A | * | 7/1967 | Brown | A47J 17/02 30/142 |
| 3,991,466 | A | * | 11/1976 | Smith | A47G 21/065 30/149 |
| 4,535,538 | A | * | 8/1985 | Nelson | A47G 21/02 30/147 |
| 4,587,734 | A | * | 5/1986 | Jonsson | A47J 43/25 30/279.6 |
| 4,984,367 | A | * | 1/1991 | Albanese | A47G 21/02 30/147 |
| 5,052,108 | A | * | 10/1991 | Yang | A47J 17/02 30/136 |
| 5,062,210 | A | | 11/1991 | Arroyo, Jr. | |
| 5,196,036 | A | | 3/1993 | Flores | |
| 5,230,156 | A | * | 7/1993 | Patenaude | A47J 43/20 30/325 |
| D376,514 | S | * | 12/1996 | Torkelson | D7/643 |
| D410,823 | S | * | 6/1999 | Abrams | D7/693 |
| 6,401,341 | B1 | * | 6/2002 | Hernandez | B26B 9/00 30/142 |
| D496,232 | S | * | 9/2004 | Kaposi | D7/688 |
| 6,898,857 | B2 | * | 5/2005 | Ruben | A47J 17/02 30/149 |
| 7,127,820 | B2 | * | 10/2006 | Miller | B23D 61/123 30/280 |
| D611,312 | S | * | 3/2010 | Eide | D7/678 |
| D800,515 | S | * | 10/2017 | Gonterman | A47J 43/288 D7/653 |
| D808,744 | S | * | 1/2018 | Hammi | D7/653 |
| 2004/0216308 | A1 | | 11/2004 | Bertulis | |
| 2006/0042097 | A1 | * | 3/2006 | Kim | A47J 17/02 30/279.6 |
| 2009/0199414 | A1 | | 8/2009 | Ramos | |

* cited by examiner

NOPAL-CACTUS THORNS REMOVAL HAND TOOL AND METHOD

TECHNICAL FIELD

This invention relates generally to the field of hand devices for scraping or peeling vegetables, more particularly to a hand device for peeling and preparing a Nopal-Cactus for cooking and/or eating in a safe way by removing its Thorns from the edible part thereof, also named "Green-Flesh".

BACKGROUND OF THE INVENTION

In some areas from USA, Mexico and other countries where cacti abound, it is very common to use the Green-Flesh from some of them—mainly from the famous Nopal-Cactus, also called "Nopal" or "prickly pear"—for different applications. Nopal-Cactus is considered a great food which can be prepared in different ways. The scope of its utility is not limited to food preparation. This vegetable is also considered a great natural medicine against different health issues (i.e. diabetes treatments, where it has been demonstrated that this vegetable is capable to decrease blood sugar in people with this problem) due to the nutrients, vitamins and minerals it contains.

It is also well known that the Nopal-Cactus is naturally protected against hostile environments and predators as it is capable to create its own Pointy Thorns which make it difficult to access to their edible part (Green-Flesh). Logically, for humans, the challenge of removing those Thorns is a lot more difficult than peeling a normal fruit or vegetable. For this reason, a variety of tools have been developed over the decades to assist humans in the Thorns' Removal task and the preparation of the Nopal-Cactus for cooking/eating or medical applications. The most basic tool for roughly performing this task is a regular kitchen knife. It is proved that a kitchen knife is inefficient for this purpose because the shape of the blade, which is normally straight, doesn't fit the concave areas very well. Therefore, the knife needs to be manipulated in different ways making the cutting process take a long time. This method is also very tedious (for someone who does NOT master this method it can take up to 10 minutes to remove the Thorns) and most of the time it results in the waste of a significant proportion of the edible part (Green-Flesh) of the vegetable. Besides this, the knife must be regularly sharpened to maintain its utility.

Another popular method for Nopal-Cactus preparation is the utilization of a common peeler (such as a potato peeler). Not being specifically designed for plants/vegetables having Thorns, utilization of a common Peeler is highly inefficient (worse than the kitchen knife) as the next lines explain: When the user is about to start the Thorns' Removal process, the peeler's cutting blade is not located flush to the Nopal-Cactus due to a gap that is always created between the vegetable and the base were the blade is mounted, forcing the user to apply great force against the Nopal to barely cut a few Thorns. Additionally, those movements create cuts in the Nopal-Cactus surface causing its drool (viscous liquid that characterizes the cactus) to come out in excess, hindering the handling of the vegetable during the Thorns' Removal operation. Moreover, the blade on these cutters is also generally straight, rendering it impractical to remove the Thorns from surfaces that are not partially flat.

In view of these difficulties, a variety of different devices have been developed specifically to peel, clean, and/or remove the Thorns from Nopal-Cactus or other kinds of cacti. That is the case of US Patent Application number 20090199414 A1, which relates to an elongated cactus cleaning tool comprising a handle and a cleaning section at one end of the handle for cleaning a section of cactus. The effectiveness of such a design to perform the desired action is unclear, since the blade is still straight making it difficult to operate over curved surfaces (same case as with the kitchen knife). Besides, this device is made of at least two pieces (the handle and the main body) making it more expensive and complicated to manufacture compared with a Cactus Cleaning Tool made in one piece. Additionally, as its sharp edge tends to get dull with usage and wear, this device should be frequently sharpened, similarly to the case of the kitchen knife described before.

The same can be said about U.S. Pat. Nos. 5,062,210A and 5,196,036A. These two patents describe tools for dethroning cacti through the use of blades or edged body structures which are at the same time attached to supporting members or handles. These irregular complex shapes make the tools (apart from difficult and expensive to manufacture), clumsy and uncomfortable to handle, clean and maintain, and unsuitable for storing them together with the remaining kitchen utensils, for example in a kitchen spoons cabinet or drawer. More importantly, to keep them operative, the blades or edged body structures of this kind of utensils should be frequently sharpened as well. As a final remark with respect to the three above-mentioned patented devices, it is appropriate to highlight that none of them can be used as slicer to complete the preparation of the NopalCactus once the Thorns have been removed, making it necessary for the user to employ a separate tool (such as a kitchen knife) to perform the final operation of cutting the vegetable into small squares or small stipes for its final consumption.

The most practical solution available so far to prepare Nopal-Cactus (considering the difficulties described in the previous lines) is probably a home-made perforated spoon. This device is usually made as a craft by the user, by drilling a circular hole in the Head portion of a regular spoon and then sharpening the circumference of that hole using a second tool. This curved inner edge is effective for peeling the Nopal and the tool can be easily stored in a cabinet together with other spoons. However, due to its shape, this tool is not useful for removing the Thorns along of the edges and corners of the Nopal-Cactus leaf (this second operation is necessary to prepare the vegetable for consumption), meaning that the user needs to utilize a second tool, such as a knife, when using this perforated spoon, thus increasing the preparation and cleaning time. In addition, to maintain the inner circumference sharp enough to perform the peeling function, the tool needs to be regularly sharpened (same case as kitchen knife and common peeler).

In sum, the need of developing a simple hand tool able to quickly and safely remove all Thorns from a Nopal-Cactus (including the lateral and corner Thorns) without utilization of additional tools (such as kitchen knife), with minimum waste of the edible portion of the vegetable, capable to achieve the removal process quicker than the previous described options and to do it at a low cost, is still unsatisfied. For this reason, we believe that providing a novel and effective Nopal-Cactus Thorns Remover which consists only of one piece, is affordable, easy to clean, easy to store and easy to maintain and in particular, one in which the user wouldn't need to use a second tool to remove the Thorns completely and to then cut the vegetable in small squares or stripes as traditionally done once Thorns are removed, fulfills the above-mentioned so far unresolved function, and therefore advances the field. Even more so, if this tool does not need to be sharpened in order to keep its utility for a long time.

SUMMARY OF THE INVENTION

The main object of the present invention is to provide an effective hand tool for Thorns' Removal from Nopal-Cactus Petals in order to prepare them for eating or cooking, which is easy to manufacture, use, clean and maintain. In addition, some embodiments of this invention include a Corner-blade with a cutting edge which can be used to cut the Nopal-Cactus once Thorns are removed (this cut is usually done with the knife). Traditional shapes in which to cut the peeled Nopal-Cactus Petal are mainly small squares, or small stripes.

Another object of this invention is to provide a hand tool suitable for removing every Thorn of an irregularly shaped Nopal Petal, including the hardest ones and those in the edges and corners of the Nopal Petals.

Yet another object of this invention is to provide means for separating the Thorns and skin of the Nopal Petals from their edible portions in less time and wasting less of the edible portion of the vegetable when compared to other cacti peeling and deThorning methods.

It is yet a further object of this invention to provide such a tool designed in such a way that its edgy portions do not need to be sharpened in order to maintain its utility.

Further objects of this invention are to provide a tool which is made of only one piece and which is suitable for comfortably and safely storing it together with the remaining kitchen utensils, for example in a kitchen spoons cabinet or drawer.

A hand tool for Thorns' Removal from a Nopal-Cactus in accordance with the present invention, is achieved by combining some or all of the following aspects:
  a) The tool is shaped as a spoon-like utensil, which has in its Head a polygonal hole in the shape of a star.
  b) The thickness of the area around the Star-Hole are narrowed with respect to the median thickness of the Head of the spoon.
  c) A secondary hole is also provided in another section of the Head of the spoon for the removal of the hardest Thorns and those in the edges and corners of the Nopal Petals.
  d) The spoon can be made in one or more pieces which an be of metal, preferably Aluminum or Stainless Steel and/or plastic.

A method for using a hand tool for dethorning and peeling Nopal cactus Petals in accordance with the present is also disclosed, comprising the following steps:
  1—Carefully grabbing the Petal with one hand, avoiding the Thorns.
  2—With the other hand grabbing the hand tool.
  3—Using the star-shaped hole to remove the skin and the superficial Thorns of the Nopal Petal by repeatedly rubbing it against the surface of the Petal in a longitudinal fashion.
  4—Using the secondary hole to remove the hardest Thorns and those in the edges and corners of the Nopal Petals.
  5—Washing the Nopal with water.
  6—Cutting the vegetable in small squares or small stripes with the tool's embedded small blade.

DETAILED DESCRIPTION AND BEST MODE OF IMPLEMENTATION

Figure 1A:
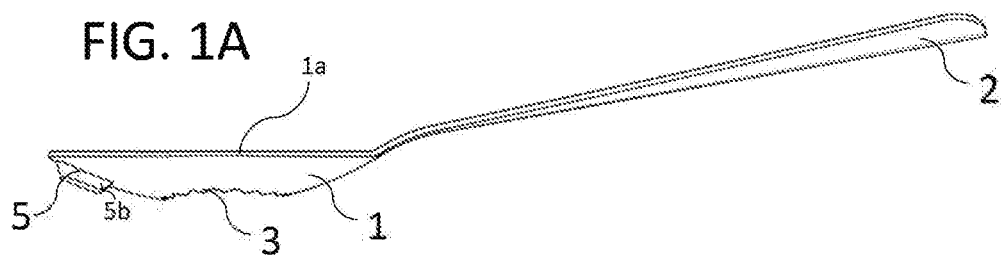
FIG. 1A is a side view of an embodiment of a Nopal-Cactus Thorns Removal Hand Tool in accordance with the present invention.
Figure 1B:
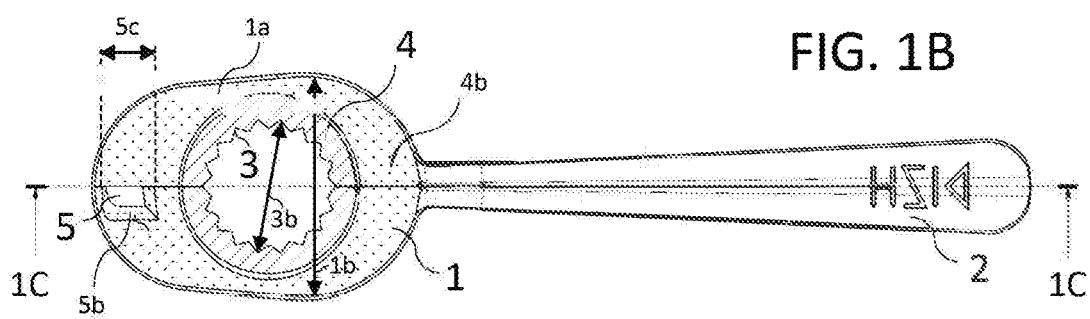
FIG. 1B is a top view of an embodiment of a Nopal-Cactus Thorns Removal Hand Tool in accordance with the present invention.

Disclosed is a Nopal-Cactus Thorns Removal Hand Tool, designed for peeling and preparing a Nopal cactus for its consumption.

As used in this specification and the appended claims, the terms "Peel"/"Peeling" and "Clean"/"Cleaning" are used indistinctly to refer to the manual removal of all the Thorns and any other non-edible parts of the plant, while the terms "Prepare"/"Preparing"/"Preparation" further include the act of cutting the clean/peeled Nopal cactus into small pieces to get it ready for its final consumption.

This is attained in an affordable and practical manner thanks to the use of a spoonshaped hand tool that can be made of plastic and/or metal, through different manufacturing techniques as will be explained below. As used in this specification and the appended claims, the term "Spoon" is used in a non-limiting sense, referring by it to general shape of an utensil having a concave Head and an elongated Handle, expanding the definition to eventually include holes, protuberances and design modifications, including but not limited to the ones herein disclosed and claimed.

The utensil, which resembles a normal spoon in its shape, can come in different sizes, ranging for that of a normal soup spoon to that of a normal serving spoon. For a smaller tool, the size of a tea or coffee spoon, it would only be possible to add the Star Hole area, that is, this mini spoon would not have space for including the Thorn-Hole or the Blade-Corner as described below. A utensil larger than a serving spoon is also possible but would be very difficult to handle for peeling a Nopal.

The main feature of this hand tool is a star-shaped polygonal hole, referred to, in the context of this specification and the appended claims, as a "Star-Hole". The area around this Star-Hole, called the Second Portion, is narrow enough so that the star can act as a serrated blade to effectively perform the Peeling function. The thickness of the Narrow Area can range from 0.1 mm to 0.4 mm. If the Head of the spoon has a thickness within that range, it would not be necessary to narrow it any further. However, if the Head of the spoon has, for example, an overall thickness of 3 mm, the Second Portion can achieve its specified range of 0.1 mm to 0.4 mm, through different processes, designs and configurations that a Person of Ordinary Skill in the Art can easily derive from the teachings of this specification, combined with notions of the general knowledge in the art. Some non-limiting examples of ways in which this can be achieved are shown in the figures and detailed in the forthcoming pages of this specification.

The Star-Hole can take the shape of any polygonal star, having as many corners as desired by design, as long as it maintains its peeling utility. The importance of this shape is that, unlike a rounded hole, it does not lose its utility with usage and wear and therefore does not need to be sharpened. For this condition to be met, the material used for the manufacturing of this part should have the adequate hardness to resist the intended use within the specified thickness range. Suitable materials for this part of the tool include Aluminum, Stainless Steel, Carbon Steel, Copper, Gold, Silver, Bronze, Platinum, Titanium and all the plastics that can be molded to form resistant rigid pieces. In some embodiments, the whole tool is made in one piece out of any one of these materials.

The outer diameter of the Star-Hole, as a proportion of the size of the width of the Head of the spoon, can range from 45% to 85%, being around 60% of it a preferred suggestion. For example if the spoon has a width of 100 mm a suitable Star-Hole could have a diameter of 60 mm. At the same time, the outer diameter of the Star-Hole can range from 1.5 cm minimum to 6 cm maximum.

In some embodiments, a secondary hole, referred to, in the context of this specification and the appended claims, as the "Thorn-Hole" is also provided in the First Portion of the Head of the spoon. Its purpose is the removal of the hardest Thorns and those in the edges and corners of the Nopal Petals. This Thorn-Hole can be shaped like a circle, square, right triangle and any other polygon. A suitable size for this hole would be of no more than 6 mm in its larger dimension, and be surrounded by Cutting-Walls protruding from its edges no more than 4 mm. Similarly to the Second Portion surrounding the Star-Hole, the Cutting Walls around the Thorn-Hole should have a thickness of between 0.1 mm and 0.4 mm, and be made of a material having the adequate hardness to resist the intended use within the specified thickness range (for example Aluminum, Stainless Steel, Carbon Steel, Copper, Gold, Silver, Bronze, Platinum, Titanium and all plastics that can be molded to form resistant rigid pieces).

Some embodiments also include a Corner-Blade, having a reduced thickness ranging from 0.1 mm to 0.4m, with the purpose of slicing the cactus once the Thorns have been removed. With the inclusion of this feature, the user does not need an additional knife, or any other tool, for complementing the present invention in the preparation of the Nopal for its consumption, being the tool here disclosed sufficient to manually complete the whole task.

Moreover, a hand tool in accordance with the present invention can also be used to remove the Thorns and leaves from the stems of roses and also to peel and slice other vegetables or fruits.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways-including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Figure 1C:
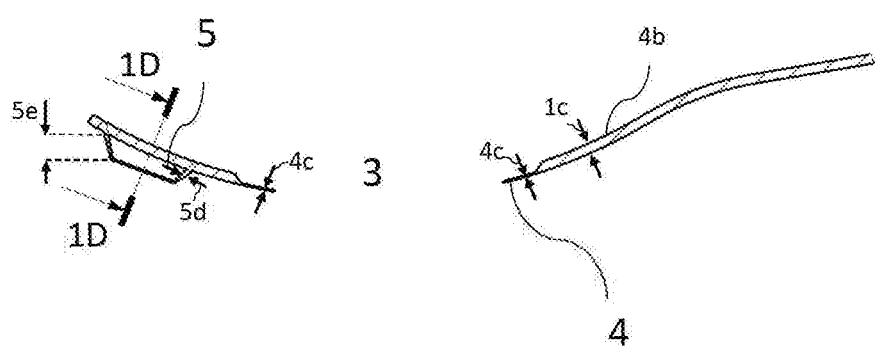
FIG. 1C is a side cross sectional view of the Head section of an embodiment of a Nopal-Cactus Thorns Removal Hand Tool in accordance with the present invention.
Figure 1D:
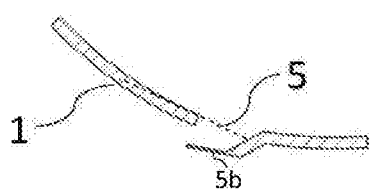
FIG. 1D is a cross sectional view of the Thorn cutter of an embodiment of a Nopal Cactus Thorns Removal Hand Tool in accordance with the present invention.

Referring to the drawings in more detail, FIGS. 1A-D illustrate an embodiment of a Nopal-Cactus Thorns Removal Hand Tool in accordance with the present invention. This embodiment has the overall structure of a normal soup spoon, having a Head 1 and a Handle 2. FIG. 1A shows a side view of the tool. In it, a lip 1a, a Star-Hole 3, and a Thorn-Hole 5, with Cutting-Walls 5b around it are shown. The same embodiment is depicted though a top view in FIG. 1B, in which further details become apparent. The Star-Hole 3 has an outer diameter 3b, which keeps a proportion to the width 1b of the Head of the spoon at its widest point, within the range of 45% to 85% of it, as prescribed by the present specification. The Second Portion 4 in this embodiment consists of a circular shape around the Star-Hole 3, having reduced thickness to enable the cutting functionality of the tool. The First Portion 4b is the area of the head 1, extending from the lip 1a to the Second Portion 4. The thorn cutting hole 5 defines a longitudinal dimension Sc that measures no more than 6 mm. The first portion 4b includes cutting walls 5b defining a cutting edge having a thickness 5d, and a width Se as shown in FIG. 1C. A cross section of the Head 1 of the tool is presented in FIG. 1C, in which the thickness 4c of the Second Portion 4, and the thickness 1c of the First Portion 4b can be appreciated. Additionally, FIG. 1D shows a cross sectional view of the tip of the Head 1 as depicted in FIG. 1C, to illustrate in more detail a possible configuration of the Thorn-Hole 5 and its Cutting-Walls 5b.

Figure 2A:
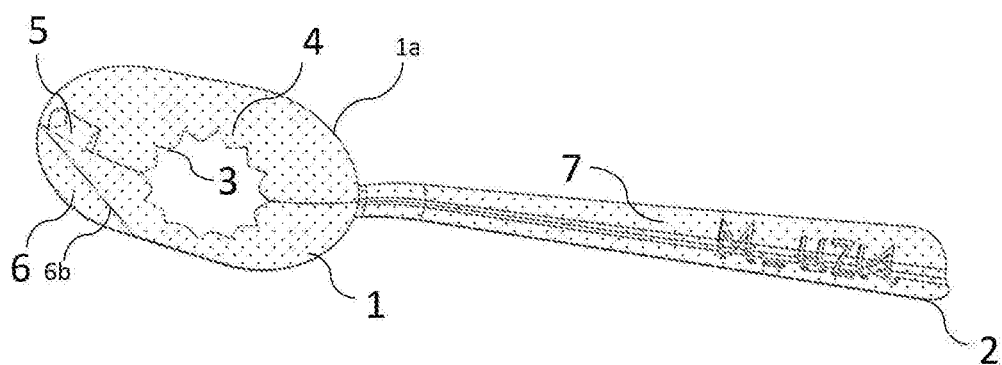
FIG. 2A is a perspective view of an embodiment of a Nopal-Cactus Thorns Removal Hand Tool in accordance with the present invention, made of metal.
Figure 2B:
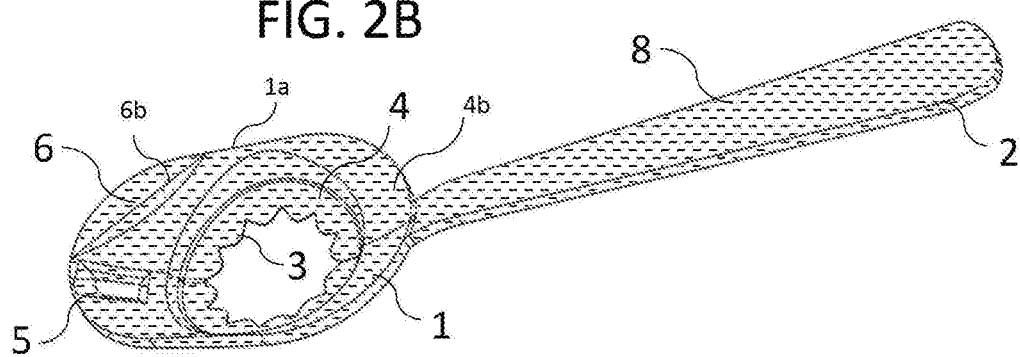
FIG. 2B is a perspective view of an embodiment of a Nopal-Cactus Thorns Removal Hand Tool in accordance with the present invention, made of plastic.
Figure 2C:
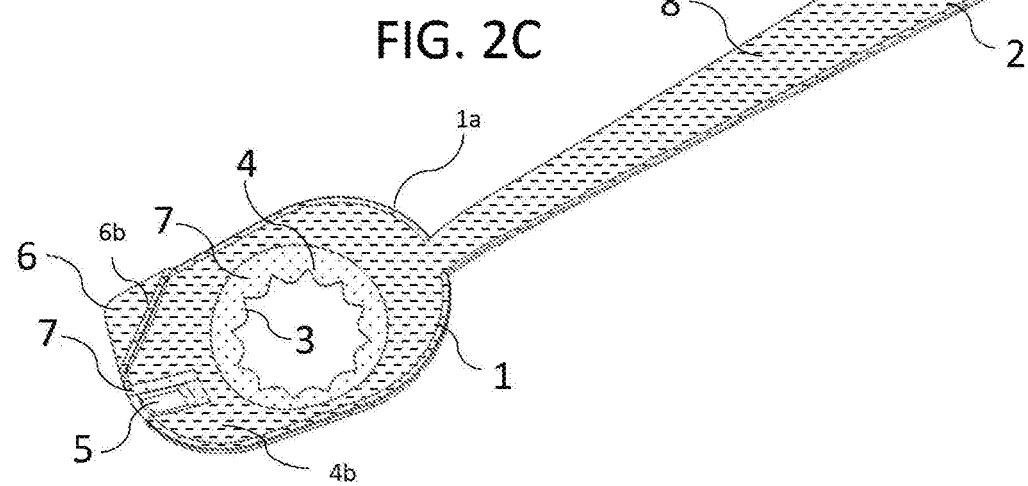
FIG. 2C is a perspective view of an embodiment of a Nopal-Cactus Thorns Removal Hand Tool in accordance with the present invention, made of metal and plastic.

FIGS. 2A-C illustrate three different embodiments of a Nopal-Cactus Thorns Removal Hand Tool in accordance with the present invention. The embodiment of FIG. 2A is made of metal 7. A Corner-Blade 6 is situated at one corner of the Head 1, extending from a segment cut 6b in a corner of the lip 1a. A spoon like this can be manufactured by metal stamping.

In another embodiment, depicted in FIG. 2B the utensil is made of plastic 8. Suitable polymeric materials for this embodiment include Polyresin, Nylon. PET, Polyethylene, PVC, Polypropylene and Polystyrene. The Corner-Blade 6, in this case, is curved but it's still useful to slice the peeled Nopal, since its texture makes it is easier to cut than harder vegetables like raw potatoes or carrots. A spoon like this can be manufactured by injection molding. The thickness of the Second Portion 4 is substantially narrowed with respect to the thickness of the Frist Portion 4b, to give it a thickness within the admitted range of 0.1 mm to 0.4 mm.

In yet another embodiment, depicted in FIG. 2C the utensil is made of plastic 8 for the First Portion 4b, the Corner-Blade 6 and the Handle 2, and of metal 7 for the Second Portion 4 and the Thorn-Hole 5. Something like this can be manufactured by over molding. Other embodiments include different combinations of plastics and metals. For example, the Handle can be plastic and the whole Head can be metallic. In fact, the Handle can be made of many other materials, including wood.

Figure 3:
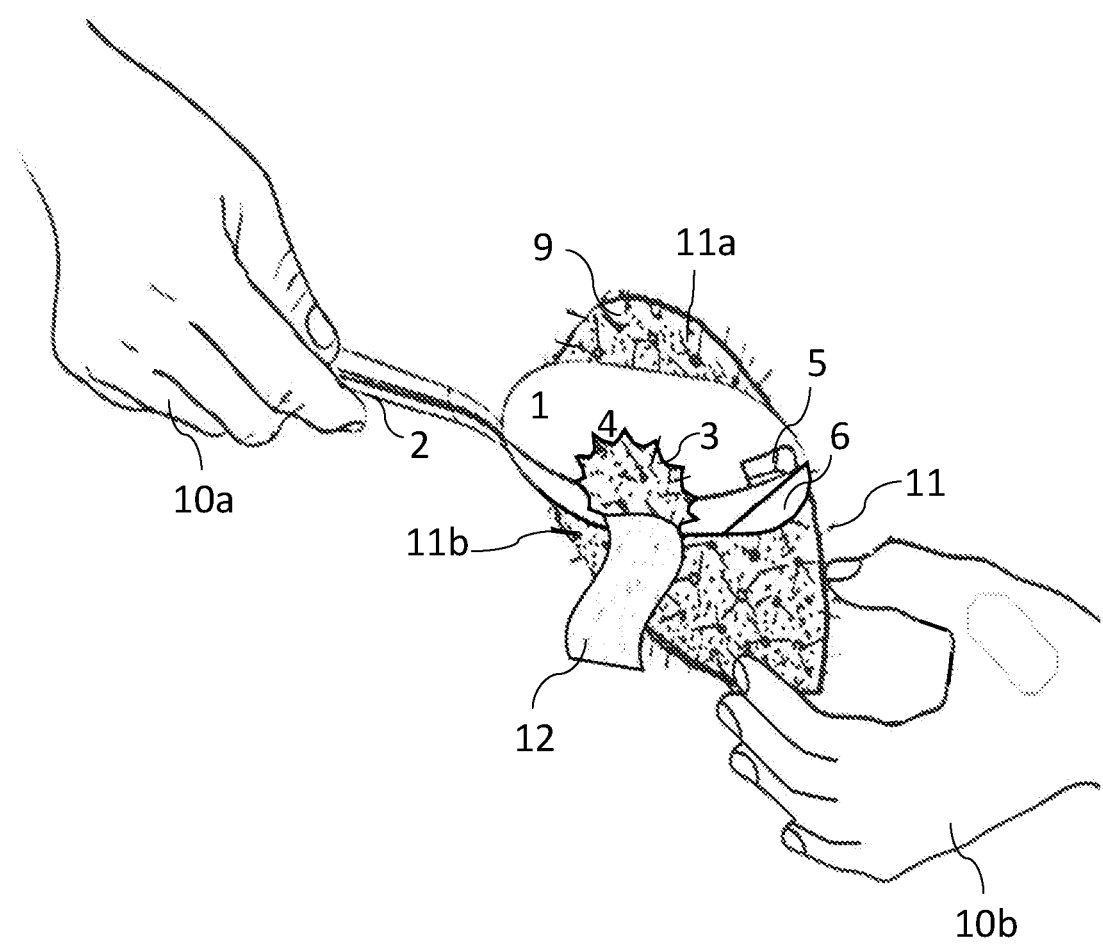
FIG. 3 illustrates the use of an embodiment of a Nopal-Cactus Thorns Removal Hand Tool in accordance with the present invention to peel and prepare a Nopal cactus.

FIG. 3 shows how a Nopal Petal 9 can be peeled with the use of a Nopal-Cactus Thorns Removal Hand Tool in accordance with the present invention. In it, the user simply grabs the utensil by its Handle 2 with one hand 10a, carefully grabbing the Petal with the other hand 10b, avoiding the Thorns 1. Using the edge of the Second Portion 4 around the Star-Hole 3, the user removes the skin 12 and the superficial Thorns 11a of the Nopal Petal by repeatedly rubbing the utensil against the surface of the Petal 9 in a longitudinal fashion. After finished, the user can use the Thorn-Hole 5 to remove the hardest Thorns and those in the edges and corners of the Nopal Petals (11b). To complete the preparation of the Nopal Petal 9, the user proceeds to wash the Nopal with water and finally cutting it in small squares or small stripes with the Corner-Blade 6.

The description as set forth is not intended to be exhaustive or to limit the invention to the precise form disclosed. Many modifications and variations are possible in light of the teachings above without departing from the spirit and scope of the forthcoming claims.

What is claimed and desired to be secured by Patent is as follows:

1. A nopal-cactus thorns removal hand tool comprising: a handle and a spoon bowl head extending from said handle, said spoon bowl head having a lip, a first portion extending from the lip, and a second portion extending from said first portion and spaced from said lip, said second portion having a cutting edge with a thickness between 0.1 mm and 0.4 mm defining a polygonal star shaped hole, and said first portion having a thorn cutting hole spaced from said lip.

2. The nopal-cactus thorns removal hand tool of claim 1 wherein said thorn cutting hole defining a longitudinal dimension that measures no more than 6 mm.

3. The nopal-cactus thorns removal hand tool of claim 1 wherein said first portion includes cutting walls defining a cutting edge having a thickness of between 0.1 mm and 0.4 mm and a width of no more than 4 mm, and said cutting edge of said cutting walls defining said thorn cutting hole.

4. The Nopal-Cactus Thorns Removal Hand Tool of claim 3, wherein said first portion and said Handle are made of plastic and said second portion and said Thorn-Hole's cutting walls are made of metal.

5. The nopal-cactus thorns removal hand tool of claim 1 wherein said first portion includes a corner blade engaging said lip and having a thickness of between 0.1 mm and 0.4 mm.

6. The Nopal-Cactus Thorns Removal Hand Tool of claim 5, made in one piece and made of metal.

7. The Nopal-Cactus Thorns Removal Hand Tool of claim 6, wherein said metal is stainless steel.

8. The Nopal-Cactus Thorns Removal Hand Tool of claim 5, made in one piece and made of plastic.

9. A method for preparing a nopal petal using said nopal-cactus thorns removal hand tool of claim 5, comprising steps of:
   (a) grabbing said handle;
   (b) using said cutting edge of said second portion to remove skin and thorns of said petal by repeatedly rubbing said second portion against said petal;
   (c) using said thorn cutting hole to remove additional thorns and additional thorns in edges and corners of said petal; and
   (d) cutting said petal into pieces with said corner blade.

* * * * *